Patented Sept. 28, 1937

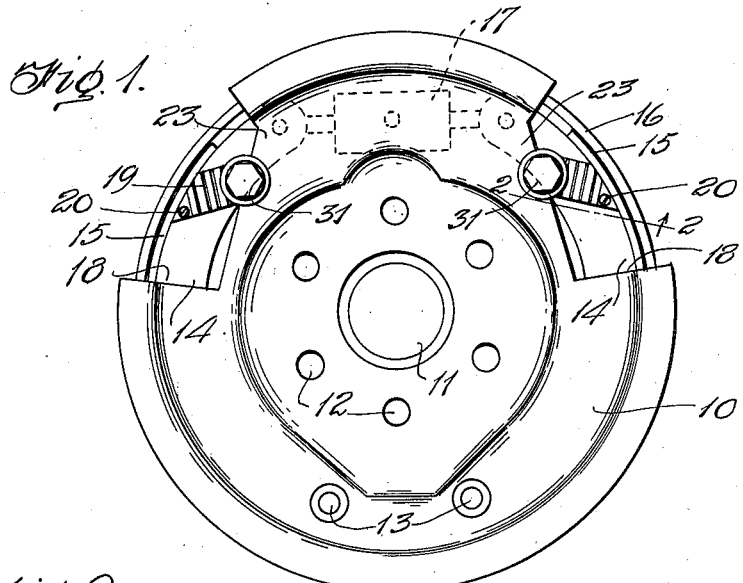

2,094,563

UNITED STATES PATENT OFFICE 2,094,563

HYDRAULIC BRAKE

Leo Harris Myers, South Burlington, Vt.

Application March 15, 1937, Serial No. 131,097

3 Claims. (Cl. 188—79.5)

This invention relates to hydraulic brakes such as are used on automobiles and other like vehicles.

More particularly the invention relates to automatic adjusting means for brake shoes.

One important object of the invention is to provide a novel pawl and ratchet device for this purpose wherein the ratchet is carried directly by the brake shoe.

A second important object of the invention is to provide a novel arrangement of this sort wherein a pawl is directly spring pressed from a fixed holder into engagement with a ratchet directly fixed on a brake shoe.

A third important object of the invention is to provide a pawl holder, in such a device, having a novel eccentric arrangement for adjusting the pawl holder.

A fourth important object of the invention is to provide a novel pawl and ratchet arrangement for such a device wherein the shape of the pawl nose and ratchet teeth assists the pawl spring in holding the pawl in engagement with the ratchet.

With the above and other objects in view as will be hereinafter apparent, the invention consists in general of certain novel details of construction and combinations of parts hereinafter fully described, illustrated in the accompanying drawing and specifically claimed.

In the accompanying drawing like characters of reference indicate like parts in the several views, and:

Fig. 1 is a side elevation of a brake housing for an automobile, the view being taken looking at the inside face of the brake arrangement and disclosing the general arrangement of the invention as associated therewith.

Fig. 2 is an enlarged detail section on the line 2—2 of Fig. 1.

Fig. 3 is a section through the pawl holder assembly on the line 3—3 of Fig. 2.

Fig. 4 is a section on the line 4—4 of Fig. 3.

Fig. 5 is a face view of one of the ratchet members used herewith.

Fig. 6 is a modified form showing the ratchet used herewith formed directly as part of the brake shoe.

Figure 7 is an enlarged fragmentary section of a portion of the ratchet and the pawl nose as used herein.

In the embodiment of the invention as herein disclosed the automatic adjustment is shown as applied to a brake device which includes a brake housing plate or disc 10 provided with a suitable central opening for the vehicle axle 11 and with bolt holes 12 for the reception of bolts (not shown) for mounting the plate in fixed relation to the chassis of a vehicle.

This plate carries a pair of pivot pins 13 on which are supported the fixed ends of brake shoes 14 which extend arcuately around the device in opposite directions from the pivots. The brake shoes 14 carry the usual brake facings 15 for engagement with the brake drum 16. This construction is common to vehicle brakes and the brakes are applied by suitable hydraulic means typically indicated at 17, the brake facings being forced into engagement with the inner surface of the brake drum by hydraulic pressure.

The disc 10 is cut away at each side as at 18 to expose portions of the brake shoes 14 and on these exposed portions are fitted certain ratchet plates 19 of general lozenge shape. These plates are here shown as secured to the respective shoes by screws 20 but it is to be understood that the screws shown are intended to represent any desired type of securing means such as riveting, welding, brazing or other means. Each of the ratchet plates is provided with a series of inwardly facing ratchet teeth of peculiar shape, each tooth having an outer convexly cylindrical face 21 and an undercut inner concavely cylindrical face 22.

The disc 10 is provided with an offset portion which in part overhangs the cutout portions or gaps 18 and in each of these overhanging portions there is provided a circular opening or hole 24. The pawl holding means includes a lower or body portion 25 of cylindrical shape and having a bore 26 centrally thereof, this bore being provided with a reduced lower end 27. Extending up from the body 25 is an externally threaded upper part 28 positioned eccentrically on the body 25 and having a bore 29 forming a continuation of the bore 26. The extension 28 fits rotatably in the opening 24 and has screwed thereon a nut 30 which, when screwed down, clamps the body 25 firmly in position. It is to be noted that rotating the body 25 shifts the axis of the bores relative to the center of the hole 24. On the upper end of the extension 28 is screwed a cap 31. A pawl pin 32 extends through the reduced bore 27 and is provided with a collar 33 which limits downward movement of the pawl. A coiled compression spring 34 surrounds the upper end of the pawl pin 32 and bears at one end against the collar 33 and at its other end against the top of the cap 31, thus urging the pawl downwardly. This pawl has a thin forwardly inclined nose 35 which is adapted to fit between the ratchet teeth and catch in the undercut portions of these teeth. It will be seen that the cap 31 also constitutes a locking or jam nut for the nut 30.

In the modification of the invention shown in Figure 6 the ratchet 36 is cast or forged as an integral part of the brake shoe 37.

In use, as the brake facings wear, the brake shoes approach the drum upon the brakes being applied and the ratchets move under the pawls in a step-by-step movement, backward movement to a greater extent than that just sufficient to free the facings from the drum being prevented by the engagement of the pawls with the ratchets, the spacing between adjacent ratchet teeth determining the normal release clearance between the shoe and drum. When the brakes are to be adjusted in order to ensure that an equal movement of each shoe occurs in applying the brakes, one or both of the pin housings are loosened and the housing or housings rotated until both ratchets bear like relation to their ratchets by reason of the curved nose on the pawl and undercut teeth on the ratchet it will be noted that as the ratchet moves outwardly by the distance of one tooth space the nose of the pawl drops behind the next tooth and freedom of movement at once occurs so that the brake can be released.

Obviously the various elements of the invention may be constructed of any material or materials found best adapted to the purpose.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new is:

1. In combination with a brake disc, a brake shoe pivoted at one end to swing toward and from the center of the disc, a ratchet carried by said brake shoe and having inwardly facing teeth, a pawl housing eccentrically mounted on said disc, a pawl spring pressed from said housing and engaging said ratchet, and means associated with the housing and securing the housing in eccentrically adjusted position.

2. The combination with a brake disc having a pair of brake shoes each pivoted at one end to said disc to swing toward and from the center of the disc, a pair of ratchets having inwardly facing teeth and each carried by a brake shoe adjacent the free end thereof, said disc having a pair of holes therein adjacent said ratchets, a pawl pin housing eccentrically mounted in each hole, a pawl pin in each housing projecting therefrom and engaging a respective ratchet, a coiled compression spring in said housing urging said pawl pin into engagement with its ratchet, and clamping means associated with each housing and clamping the housing in eccentrically adjusted position.

3. The combination with a brake disc having a pair of brake shoes each pivoted at one end to said disc to swing toward and from the center of the disc, a pair of ratchets having inwardly facing teeth and each carried by a brake shoe adjacent the free end thereof, said disc having a pair of holes therein adjacent said ratchets, a pawl pin housing eccentrically mounted in each hole, a pawl pin in each housing projecting therefrom and engaging a respective ratchet, a coiled compression spring in said housing urging said pawl pin into engagement with its ratchet, and clamping means associated with each housing and clamping the housing in eccentrically adjusted position, the teeth of said ratchets having outer convexo-cylindrical faces and undercut inner concavo-cylindrical faces and the pawls having thin outwardly directed noses engaging in the undercut portions of the ratchet teeth.

LEO HARRIS MYERS.